United States Patent Office 3,019,460
Patented Feb. 6, 1962

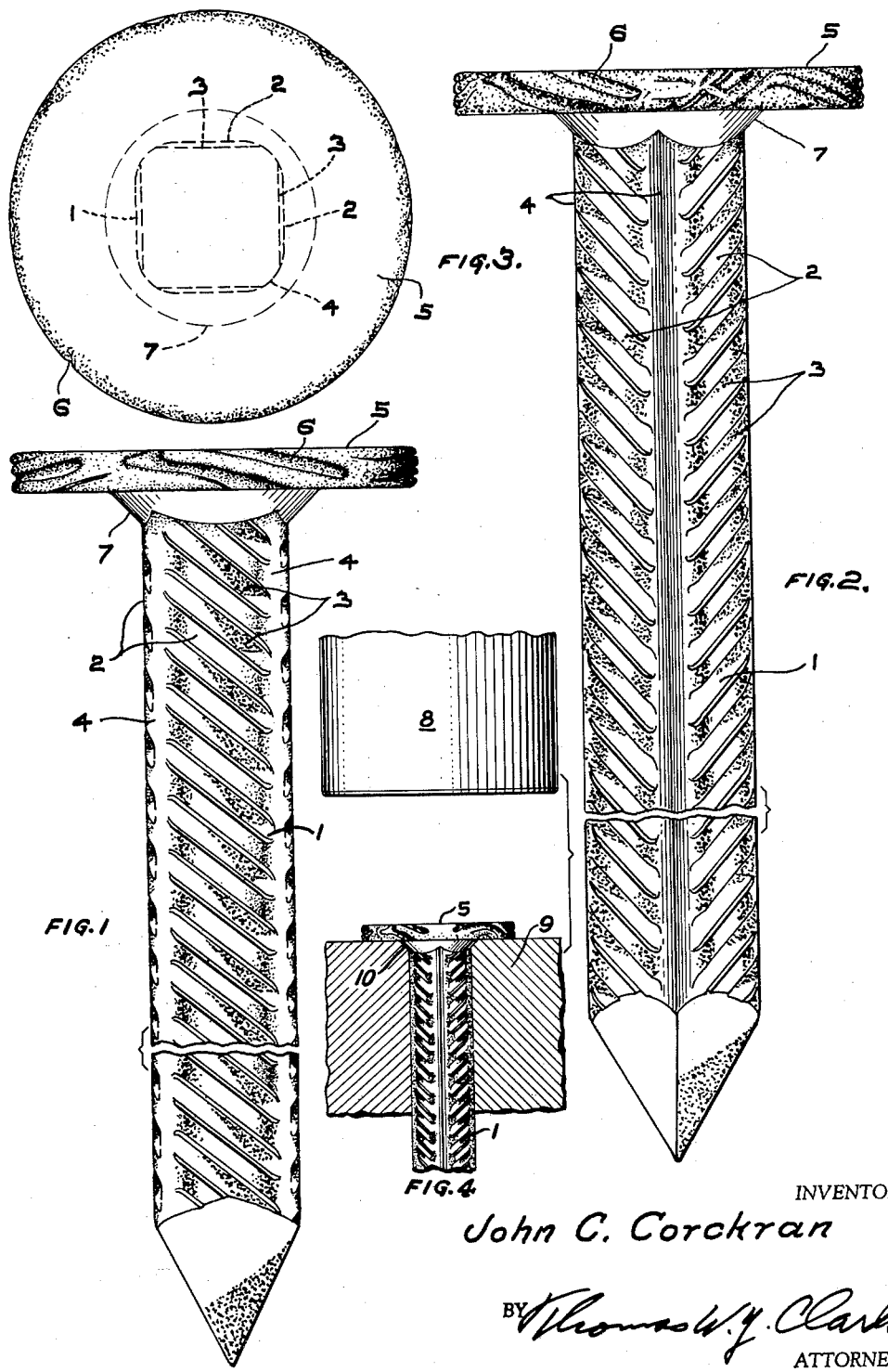

3,019,460
METHOD OF MAKING ROUNDED HEAD NAIL
John C. Corckran, 5300 Purlington Way, Baltimore, Md.
Filed Oct. 22, 1956, Ser. No. 617,553
3 Claims. (Cl. 10—54)

This invention relates to a round headed flat sided nail and the process of making it by cold forging. An economical process for the production of wire nails is to upset one end of a wire before the nail is severed from the length of wire and in accomplishing this upsetting, the wire is held in a vice having an opening the shape of the shank of the nail or of the wire. When the wire and consequent nail are round, the production of a round head on the nail offers no difficulty, but when the wire is square or has other flat sided configurations, the gripping device has an opening of a similar configuration in order not to distort the shape of the nail. It is desired even with these flat sided nails to have round heads. They could be made by making the header with a round opening in it so that when the header strikes the end of the wire for making the nail, the round flat opening in the header would be completely filled with the metal of the wire for making the nail, the round flat opening molded round. It is far more convenient, however, to use a flat faced header which is driven axially of the wire or nail and with its flat face normal to the wire or nail and in which event the upset portion of the wire tends to spread out in all directions substantially equally.

If the shank of the nail, or the wire, is square, the skin tension of the periphery of that wire tends to give the head upset upon it a square shape, this skin tension holding the periphery of the wire constricted at all times and tending to make the shape of the head conform to the shape of the wire.

It has been found that if the flat surface of the wire or of the nail shank is ever so slightly scored or ruptured so as to relieve the skin tension at that point, that in the upsetting operation the metal in the wire will spread toward the score or rupture, apparently because the metal is restrained by the skin tension of the adjacent portions on each side of the score or rupture, and being free to spread, spreads or flows toward the rupture which is weakened and fills the space caused by the score or rupture and spreads beyond the margin the head would otherwise attain, thus making a rounder head.

In the production of the flat faced shank nails, it is important that the corners be smooth. The shank can either be flat or rounded at the corners but the surface should not otherwise be ruptured in order to maintain the skin tension at the corners strong to prevent the nail head, in the upsetting process, from spreading outwardly in the direction of the corners.

The object of the present invention is therefore to place a round head on a nail having flat sides, whether having rectangular, square or other cross-sectional configuration. The object is to accomplish this with a flat faced header with its flat face operating normal to the nail wire by upsetting the end of the nail shank.

Another object of the invention is to place a fillet between the head and shank of the nail to strengthen the attachment between these two portions of the nail and to further promote the rounding of the head on the nail.

Another object of the invention is to make the round head on the nail with the least possible change in the routine manufacture of the nail.

Another object of the invention is to make a round head on a nail having a flat sided shank wherein the corners of the nail shank are peripherally smooth and are either slightly flattened or rounded.

Another object is to place a round head on a nail having a flat sided shank in which the sides of the shank have been scored or corrugated to retain the nail in the wood and in which these corrugations have not been carried to the extreme corners of the nail so that the corners remain round or flat, at large angles with respect to the flat sides of the nail.

Another object of the invention is to make a round head on a nail having flat sides by using a minimum amount of metal for making the head. It has been found in practice that where too much metal is exposed for making the head, that the head does not always form with the shank in the center, also it spreads out and at times even spatters away from the metal comprising the nail. It is therefore quite desirable to form a fillet under the head to conserve on the amount of metal required to make a cohering head. It has also been found that the use of the fillet appears to direct the metal or give it a path to follow toward the scored, ruptured or weakened periphery of the sides of the shank which have been ruptured so as to flow the metal toward the flat sides of the shank. This avoids the flow of the metal outwardly to the corners of the shank as these corners would appear in the upset portion forming the head. With the fillet round, a larger path for the flow of metal is provided at the flat sides of the nail shank than at the corners, since the fillet scarcely extends beyond the shank corners at the head. The scoring or rupturing allows the metal to slip or flow directionally upon the relief of the tension peripherally of the shank. It should, of course, be understood that the upsetting is done by a smooth headed header working axially to the nail.

A corrugated nail making machine suitable for carrying out this invention is shown in applicant's Patent 2,821,727, February 4, 1958, filed May 16, 1955.

Other objects and advantages of the nail and the process of making it involving this invention will be apparent from the following description and the accompanying drawings forming a part hereof and in which:

FIGURE 1 is a front elevational view of a square nail having a round head upset thereon.

FIGURE 2 is an elevational view of the nail of FIGURE 1 rotated to an angle forty-five degrees from FIGURE 1.

FIGURE 3 is a top plan view of the nail of FIGURE 1.

FIGURE 4 is a horizontal fragmentary view of the header of the nail holding vise, the latter in section, holding a portion of a nail at an angular position as shown in FIGURE 2.

The wire 1 forming the nail of this invention has flat sides 2 which have corrugations sunk into them at 3. The flat sides and corrugations are formed on stock which was originally round and the forming of the flat sides and corrugations stops short of the corners, leaving them substantially round and smooth as shown at 4. The corrugations by their angular displacement longitudinally of the nail score every cross-sectional length of the wire forming the shank of the nail so that any particular point where the wire may be cut off to form a nail of the desired length, the portion at the end of the shank which will project beyond the vise or grip of the wire to form the head 5 will be ruptured or scored on the flat surfaces of the shank. This rupturing or scoring consequently weakens the flat sides of the shank and when the upsetting operation takes place, the metal is released to flow toward the ruptured or scored portions as at 6 of the shank so that the metal there expands faster than the spread of the metal toward the corners of the shank and consequently a rounded head is produced as shown. The small circular fillet 7 is formed by drilling out the end of the shank holding vise with a round faced drill.

Metal fills this space in the upsetting operation. This circular fillet projects further from the flat sides of the nail shank than from the corners and consequently makes a fuller or freer path for the passage of the metal outwardly from the shank toward the parts of the head nearest the flat sides of the shank to promote the making of the head round.

The rupturing of the shank surface may be a scoring, nicking, corrugating, pricking, knurling, denting or other operation that so disturbs the skin tension as to materially weaken it at the rupture, so that on upsetting, the metal flows toward the rupture, and in the claims the word rupture bears this meaning.

It will be apparent that if the ruptures are continuous along the shank, that the nail lengths in the machine may be cut without particular attention to the location of the ruptures to assure their presence in the shank portions which become the nail heads.

The only other method of making a round head on a nail having flat sides is to mold the head as above suggested and the method of the instant invention is believed much to be preferred. It will be apparent that the rupturing or scoring of the flat sides of the nail shank may be done in various ways and the placing of the corrugations on the sides is only one method of performing that step. The roundness of the head will be greatly enhanced if the rupturing or scoring extends substantially across the flat sides of the nail shank as shown in the instant invention because this weakens substantially the whole flat periphery of the nail shank.

What is claimed as new and is desired to be secured by Letters Patent is:

1. The process of forming a substantially round head on a generally square shank of a wire fastener having substantially flat sides joined by substantially smooth receding corners comprising: rupturing each shank side with indentations angular to the longitudinal axis terminating short of the corners, holding the shank in a generally square vise with the head forming end projecting from the vise, striking the projecting end axially with a substantially smooth-faced header for upsetting the end to flow the metal freely outwardly, the ruptured indentations permitting the metal to flow more readily at such ruptured flat portions than at the corner portions and thereby producing a substantially round head.

2. The process of forming a substantially round head on the shank of a wire fastener having substantially flat sides of substantially equal width joined by substantially smooth receding corners comprising: rupturing each shank side with indentations angular to the longitudinal axis terminating short of the corners at the end portion of which the head is to be formed, holding the shank in a vise, the gripping jaws of which have an opening therein substantially the shape of the shank with the head forming end projecting from the vise, striking the projecting end axially with a substantially smooth-faced header for upsetting the end to flow the metal freely outwardly, the ruptured indentations permitting the metal to flow more readily at such ruptured flat portions than at the corner portions and thereby producing a substantially round head.

3. The process of forming a substantially round head on the shank of a wire fastener having substantially flat sides of substantially equal width joined by substantially smooth receding corners comprising: rupturing each shank side with indentations angular to the longitudinal axis terminating short of the corners at the end portion of which the head is to be formed, holding the shank in a vise the gripping jaws of which have an opening therein substantially the shape of the shank with the head forming end projecting from the vise, the opening in the vise being shaped to form a cupped depression surrounding the opening at the shank projecting end, striking the projecting end axially with a substantially smooth-faced header for upsetting the end to flow the metal freely outwardly, the ruptured indentations permitting the metal to flow more readily at such ruptured flat portions than at the corner portions and thereby providing a substantially round head and a circumferential fillet between the head and shank, the vise cupped depression providing additional space for the flow of metal at the ruptured portion.

References Cited in the file of this patent

UNITED STATES PATENTS

| 316,717 | Young | Apr. 28, 1885 |
| 333,889 | Perry | Jan. 5, 1886 |
| 340,692 | Bailey | Apr. 27, 1886 |
| 457,237 | Tyers | Aug. 4, 1891 |
| 461,510 | Raymond | Oct. 20, 1891 |
| 672,465 | Walker | Apr. 23, 1901 |
| 1,418,186 | Howarth | May 30, 1922 |
| 2,759,389 | Corckran | Aug. 21, 1956 |
| 2,819,641 | Corckran | Jan. 14, 1958 |

FOREIGN PATENTS

| 940,244 | France | Dec. 7, 1948 |